(12) United States Patent
Saccoccio et al.

(10) Patent No.: US 10,214,931 B2
(45) Date of Patent: Feb. 26, 2019

(54) PRE-FILTER WATER SKIMMER

(71) Applicant: Asia Connection LLC, New York, NY (US)

(72) Inventors: Mitch Saccoccio, Clarksville, VA (US); Jonathan Bonelli, New York, NY (US)

(73) Assignee: Asia Connection LLC, New York, NY (US)

(*) Notice: Subject to any disclaimer, the term of this patent is extended or adjusted under 35 U.S.C. 154(b) by 0 days.

(21) Appl. No.: 14/721,493

(22) Filed: May 26, 2015

(65) Prior Publication Data

US 2015/0354242 A1    Dec. 10, 2015

Related U.S. Application Data

(60) Provisional application No. 62/009,968, filed on Jun. 10, 2014.

(51) Int. Cl.
*B01D 29/27* (2006.01)
*B01D 29/31* (2006.01)
(Continued)

(52) U.S. Cl.
CPC .......... *E04H 4/1272* (2013.01); *B01D 29/27* (2013.01); *B01D 29/31* (2013.01); *B01D 29/35* (2013.01); *B01D 29/50* (2013.01); *B01D 29/58* (2013.01); *E04H 4/00* (2013.01); *E04H 4/12* (2013.01); *B01D 2201/02* (2013.01); *C02F 2103/42* (2013.01); *E04H 4/1245* (2013.01)

(58) Field of Classification Search
CPC ....... E04H 4/1272; E04H 4/1281; E04H 4/00; E04H 4/12; E04H 4/1245; B01D 29/01; B01D 29/13; B01D 29/23; B01D 29/56; B01D 29/58; B01D 29/27; B01D 29/31; B01D 29/35; B01D 29/50; B01D 2201/02; C02F 2103/42
See application file for complete search history.

(56) References Cited

U.S. PATENT DOCUMENTS 4,022,690 A * 5/1977 Smith .................. E04H 4/1209
210/167.1
4,701,259 A * 10/1987 Rosaen .................. B01D 29/23
210/450

(Continued)

OTHER PUBLICATIONS

Filter Specialists, Inc. "X100 convertible filter housing". 2004.*

*Primary Examiner* — Katherine Zalasky
*Assistant Examiner* — Benjamin Lebron
(74) *Attorney, Agent, or Firm* — Dilworth & Barrese, LLP (57) ABSTRACT

A pre-filter skimmer system that reduces the amount of debris and particles entering the water filter in order to increase the longevity of the water filter is disclosed. The pre-filter skimmer system includes a chamber including an inlet and an outlet, wherein the water enters via the inlet and exits via the outlet. The water enters a first collector that is positioned at least partially within the chamber, the first collector configured to capture particles of a first size carried by the water. From here, the water enters a second collector that is positioned downstream of the first collector, wherein the second collector is configured to capture particles of a second size smaller than the first size that passed through the first collector.

16 Claims, 6 Drawing Sheets

(51) Int. Cl.
   *B01D 29/35* (2006.01)
   *B01D 29/50* (2006.01)
   *B01D 29/58* (2006.01)
   *E04H 4/00* (2006.01)
   *E04H 4/12* (2006.01)
   *C02F 103/42* (2006.01)

(56) References Cited

U.S. PATENT DOCUMENTS

| | | | | |
|---|---|---|---|---|
| 4,848,620 A * | 7/1989 | Chap | ............... | B65D 21/048 |
| | | | | 206/505 |
| 5,202,020 A * | 4/1993 | Desjoyaux | ............ | B01D 29/27 |
| | | | | 210/416.2 |
| 5,372,718 A * | 12/1994 | Zebian | ............... | B01D 29/117 |
| | | | | 210/301 |
| 5,417,855 A * | 5/1995 | Gershenson | ........... | B01D 29/27 |
| | | | | 210/232 |
| 5,560,820 A * | 10/1996 | Consolo | ............... | B01D 29/23 |
| | | | | 137/41 |
| 5,914,036 A * | 6/1999 | Sullivan, Jr. | ........ | B01D 29/012 |
| | | | | 210/232 |
| 5,989,421 A * | 11/1999 | Davis | .................... | B01D 29/23 |
| | | | | 210/232 |
| 6,231,058 B1 * | 5/2001 | Kimbrough | ........... | B62B 3/1472 |
| | | | | 224/411 |
| 6,572,765 B2 * | 6/2003 | Lincke | ................... | B01D 29/27 |
| | | | | 210/167.12 |
| 6,706,174 B1 * | 3/2004 | Keith | .................... | B01D 29/58 |
| | | | | 210/167.12 |
| 7,402,242 B2 | 7/2008 | Duckett | | |
| 7,553,425 B2 | 6/2009 | Stern et al. | | |
| 7,727,387 B2 | 6/2010 | Goggin | | |
| 7,815,797 B1 * | 10/2010 | Keith | ................... | E04H 4/1272 |
| | | | | 210/167.19 |
| 7,909,991 B2 | 3/2011 | Hernandez | | |
| 8,168,065 B1 * | 5/2012 | Gavigan | ................ | C02F 1/76 |
| | | | | 210/167.11 |

* cited by examiner

PRE-FILTER WATER SKIMMER

REFERENCE TO PRIOR APPLICATION

This application claims the benefit of U.S. Provisional Application No. 62/009,968, filed Jun. 10, 2014, the entire contents of which are incorporated herein by reference.

BACKGROUND

The present invention relates to systems for cleaning debris from swimming pool water, and more particularly to a skimmer for removing debris from the water in advance of the pump and filtration system.

All swimming pools, both smaller residential pools and larger public or institutional swimming pools, require a significant amount of maintenance in order to provide a safe, enjoyable, and hygienic swimming experience to the users of the pool. Swimming pool maintenance efforts primarily include the circulation and filtration of the water contained in the pool, and the maintenance of the proper levels of chemicals (such as chlorine) designed to eliminate the growth of bacteria, algae, and other undesirable organisms.

Most pool water circulation systems include some level of debris filtration. For example, pump systems include a filter. Also, skimmers typically include a basket to remove larger debris such as leaves, twigs, sticks, grass clippings, bits of paper, trash, or other material. Conventional skimmer baskets have orifices in the range of about ¼ inches. Accordingly, only the larger debris is caught by the basket. The remaining finer debris goes directly to the pump filter, requiring clean-up of the pump and main filter. What is needed is a more thorough debris removal system in advance of the pump and main filter.

SUMMARY

A pre-filter skimmer system for reducing the amount of debris entering a pump and main filter is provided herein. The pre-filter skimmer system comprises a chamber having an inlet and an outlet, wherein water enters via the inlet and exits via the outlet; a first collector positioned at least partially within the chamber, the first collector configured to capture particles of a first size carried with the water; and a second collector positioned downstream of the first collector, wherein the second collector is configured to capture particles of a second size smaller than the first size that passed through the first collector.

A method for pre-filtering water and reducing the amount of debris entering a pump and main filter is also provided herein. The method for pre-filtering water comprises receiving water via an inlet; capturing particles from the received water in a first collector; and after the water passes through the first collector, capturing additional particles from the water in a second collector, wherein the additional particles are particles that were not captured by the first collector.

Another aspect of the present disclosure includes an apparatus including a chamber, the chamber comprising an inlet portion where water enters the chamber; an upstream collector configured to capture a first set of particles carried with the entered water; a downstream collector configured to capture a second set of particles carried with the water; and an outlet portion where the water exits the chamber.

BRIEF DESCRIPTION OF THE DRAWINGS

Various embodiments are described below with reference to the drawings, wherein.

Like reference numerals indicate similar parts throughout the figures.

DETAILED DESCRIPTION OF PREFERRED EMBODIMENT(S)

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying figures.

The pre-filter skimmer system described herein includes two skimming devices within a skimmer system, which are configured to capture debris, particles and objects contained in pool water prior to entering the pump and main filter. The skimming devices allow for a dual-skimming system by removing bacteria, pollen, and dirt so that many of these particles never enter the pump and main filter. Such a system is advantageous because it reduces the strain that would typically be exerted on the pump and main filter to filter all of these extra particles. Reducing the strain on the pump and main filter in turn lengthens the shelf life of the pump and the main filter or otherwise time between cleanings. Such skimmer systems may be used for swimming pools, hot tubs, spas, or any other facility that requires the filtering of water.

Figure 1:
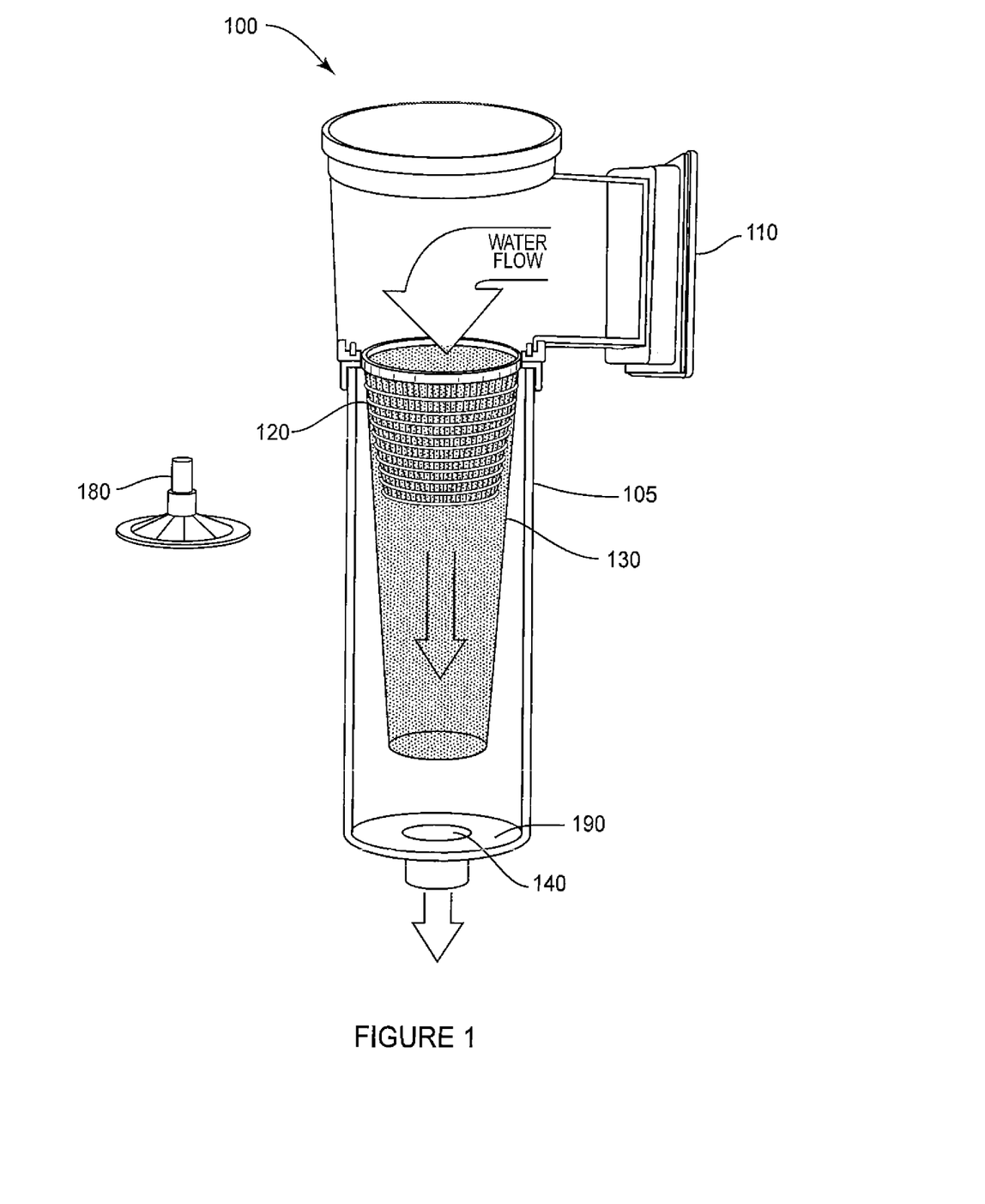
FIG. 1 is an overview of the pre-filter skimming system in accordance with the present disclosure.

Referring to FIG. 1, the present invention relates to a pre-filter skimmer system which provides improved removal of debris before such debris reaches the pump and main filter. A pre-filter skimmer system 100 includes a chamber 105 having an inlet 110 at an upstream end through which pool water enters and an outlet 140 at a downstream end through which water exits. Chamber 105 further includes a basket 120 and a pre-filter sifter 130, wherein basket 120 may sit at least partially within pre-filter sifter 130. Pool water flows through inlet 110, down through basket 120, pre-filter sifter 130, and then finally to outlet 140 defined by a base 190 of chamber 105. Outlet 140 may direct the pool water to a pump and main filter (not shown). In addition, pre-filter skimmer system 100 may include a vacuum plate 180, which can be used with basket 120 and/or pre-filter sifter 130. Vacuum plate 180 fits over basket 120 and/or pre-filter sifter 130 to enable the user to attach a vacuum hose to vacuum the bottom of the swimming pool.

As illustrated in FIG. 1, pool water and various debris, bacteria, etc. enters in through inlet 110. The pool water may be directed to inlet 110 by pool wall jets located on a side of the pool opposite pre-filter skimmer system 100. For example, the one or more pool wall jets may shoot out a stream of water, thereby causing the flow of the pool water to move toward inlet 110. Alternatively or in addition, pre-filter skimmer system 100 includes a suction attribute on outlet 140 that suctions water and its associated debris, bacteria etc. into the filter. The leaves, dirt, debris etc. that are suctioned via a vacuum system when vacuum plate 180 is in use will follow a similar path within pre-filter skimmer system 100 as the debris that simply enters via inlet 110 without the vacuum system.

Figure 2:
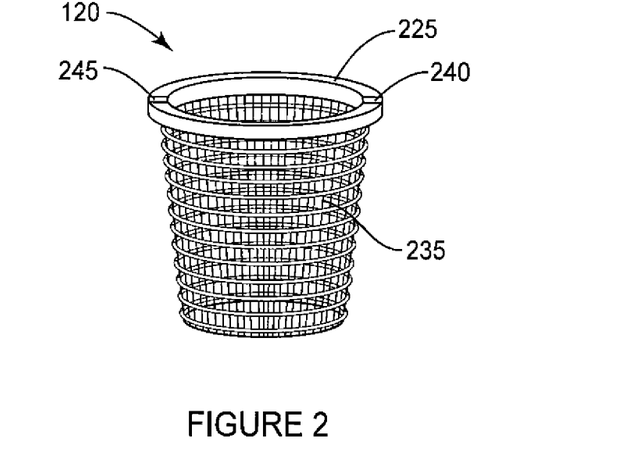
FIG. 2 is a perspective view of a basket in accordance with the present disclosure.

As shown in FIG. 2, basket 120 may have a first rim 225 and a skimming portion 235. First rim 225 may rest inside pre-filter sifter 130 while skimming portion 235 hangs below to capture debris. First rim 225 can have tabs 240 and 245 to mate with notches on pre-filter sifter 130, which is discussed in more detail below. First rim 225 and skimming portion 235 may be comprised of a single piece of material or separate pieces that are coupled together. For example, first rim 225 and skimming portion 235 may be made up of a single piece of plastic or metal or any variation thereof. If first rim 225 and skimming portion 235 are separate pieces, they may be coupled together via a coupling mechanism, such as a screw, bolt, etc. It should be noted that the term skimming portion should not be restricted to a plastic skimmer, but any material (e.g., plastic, metal, etc.) that is capable of withstanding water pressure and has orifices to capture objects.

Skimming portion 235 of basket 120 has orifices to allow water and small particles to flow through. The orifices are small enough to allow skimming portion 235 to capture larger particles, such as leaves, trash, pool toys and other small objects. The orifices may be ⅛ to ⅜ inch wide, and preferably ¼ inch orifices to capture larger debris. Various types, grades and sizes of skimming portion 235 are available as well. In this regard, skimming portion 235 may be removably attachable to basket 120, such as to first rim 225, via screws, bolts, male-female mating mechanisms, etc. Alternatively, there may be multiple types of skimming portions 235 that attach to basket 120. Skimming portion 235 may change based on the intended purpose, such as based on the size of debris or type of debris the user wants basket 120 to collect. As an example, different skimming portions 235 may include different sized orifices or different types of material used. In addition, skimming portion 235 of basket 120 may be deeper than baskets used for the same purpose to capture more debris. Smaller baskets may cause the basket to fill-up quicker, which could potentially hinder the free-flow of water and smaller particles from entering pre-filter sifter 130, chamber 105 and ultimately outlet 140. Alternatively, if a smaller basket is used, then the basket may need to be checked and emptied more frequently than a larger basket.

Figure 3:
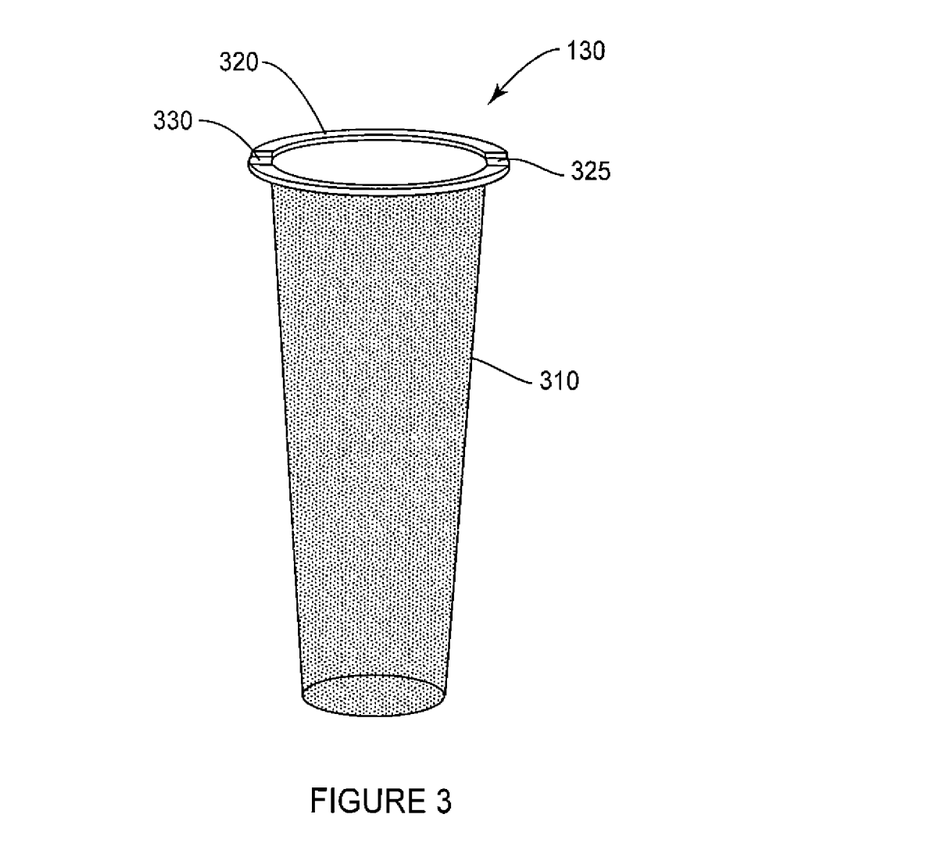
FIG. 3 is a perspective view of a pre-filter sifter in accordance with the present disclosure.
Figure 4:
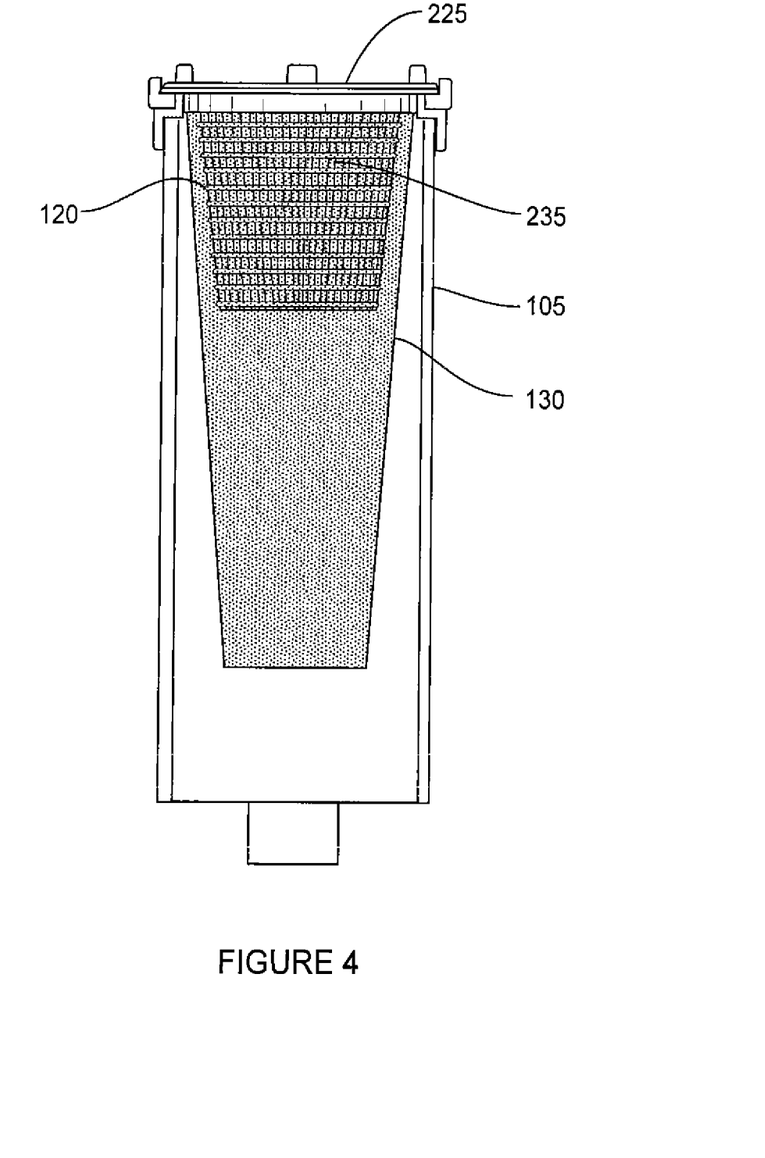
FIG. 4 is a plan view of the basket and pre-filter sifter in accordance with the present disclosure.

As shown in FIG. 3, pre-filter sifter 130 has a second rim 320 and a pre-filter skimming portion 310. Second rim 320 also contains two notches 325 and 330 to connect with tabs 240 and 245 on first rim 225 of basket 120, which is discussed in more detail below. Second rim 320 may be manufactured of plastic, metal, etc., or any material capable of holding up first rim 225 of basket 120 when first rim 225 rests on second rim 320. Pre-filter skimmer 310 may be comprised of fabric with orifices in order to capture various debris including dirt, pollen, bacteria, etc. Alternatively, pre-filter skimmer 310 may be comprised of any material capable of capturing debris and withstanding a flow of water, including plastic, metal, or any combination thereof.

Referring to FIGS. 4 and 5A-D, first rim 225 of basket 120 rests on second rim 320 of pre-filter sifter 130. In this regard, basket 120 at least partially rests within pre-filter sifter 130.

Figure 5A:
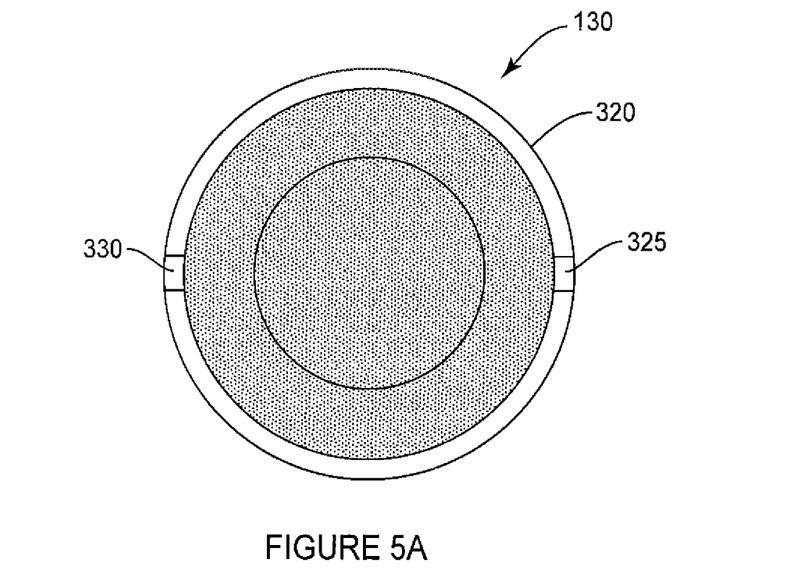
FIG. 5A is a top view of the mating mechanism of the pre-filter sifter.
Figure 5B:
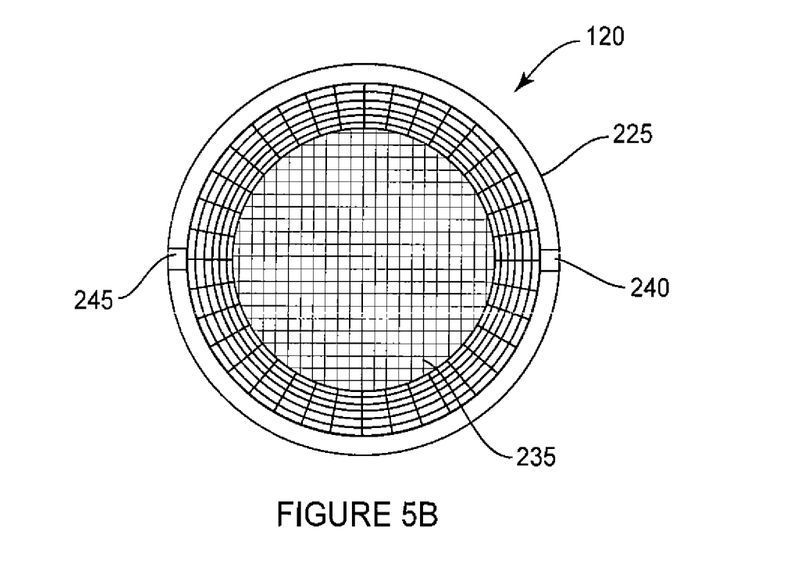
FIG. 5B is a top view of the mating mechanism of the basket.

First rim 225 may mate with second rim 320 via a mating mechanism. As shown in FIGS. 5A-B, second rim 320 includes notches 325 and 330 for tabs 240 and 245 of first rim 225 to mate with. Notches 325 and 330 may be indents in which tabs 240 and 245 can be placed in. The shape and size of notches 325 and 330 correspond to the shape and size of tabs 240 and 245 in order for tabs 240 and 245 to accurately and securely fit into notches 325 and 330. This type of mating mechanism prohibits the basket from rotating while sitting on top of the pre-filter sifter, especially since pool water will be constantly entering the skimmer. As another example of a mating mechanism, first rim 225 may include one or more pins that correspond to one or more holes on second rim 320. Other mating mechanisms are also contemplated.

Figure 5C:
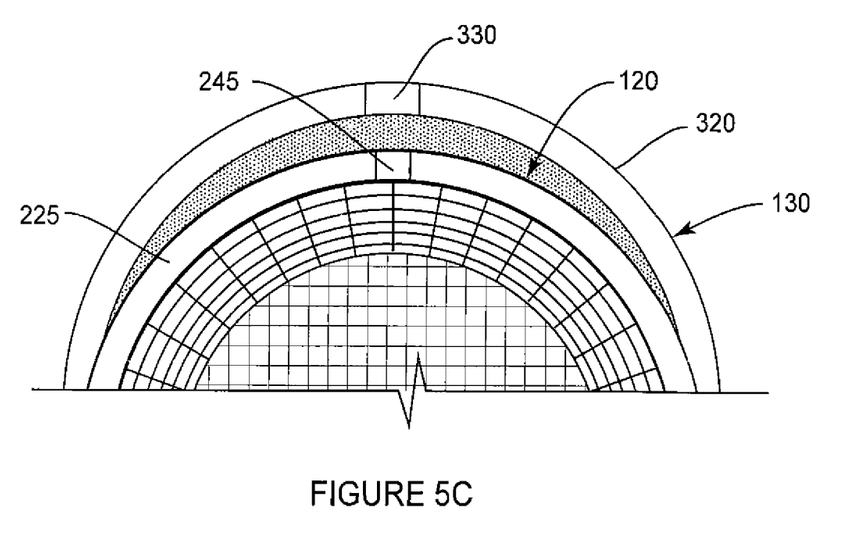
FIG. 5C is a partial top view of a tab and notch mating mechanism in accordance with the present disclosure.

FIG. 5C depicts a partial top view of tab 245 fitting into notch 330. As illustrated in FIG. 5C, the size and shape of tab 245 corresponds to the size and shape of notch 330 in order for the two components to securely mate. In the example shown rectangular notches and tabs are depicted, but other shapes and sizes are possible as well, such as cylindrical tabs and cylindrical corresponding notches.

Figure 5D:
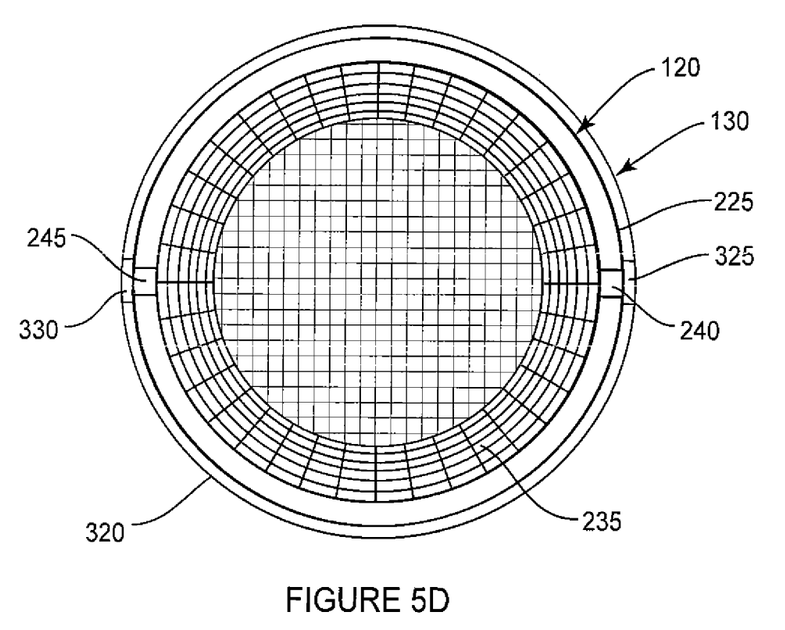
FIG. 5D is a top view of the basket mated with the pre-filter sifter.

FIG. 5D illustrates a top view of basket 120 mated with pre-filter sifter 130. It should be noted that basket 120 is covering the components of pre-filter sifter 130, including notches 240 and 245 and second rim 320. In addition, as described above vacuum plate 180 would be placed on top of basket 120 if implemented in this scenario.

Figure 6:
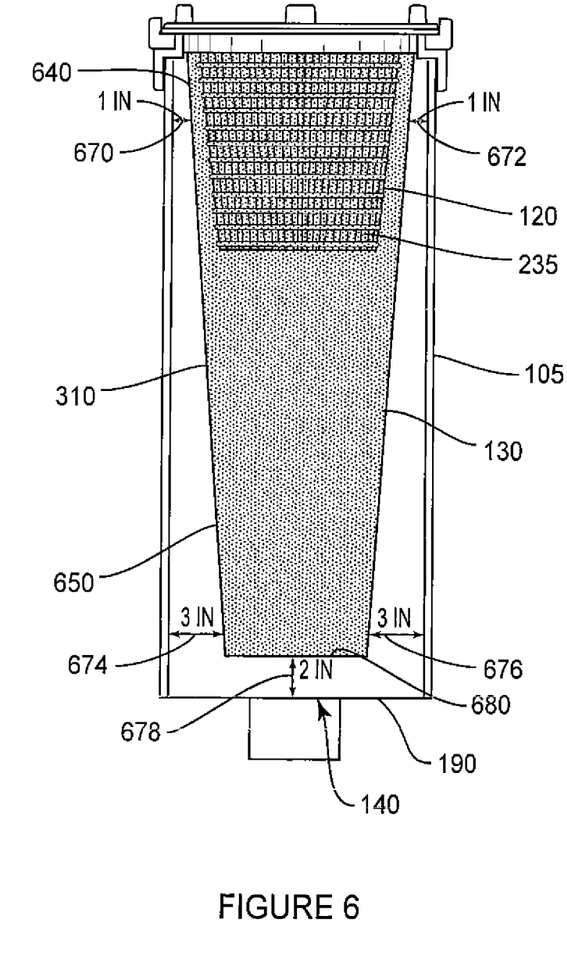
FIG. 6 is a view of the pre-filter sifter in relation to the basket and chamber.

Referring to FIG. 6, pre-filter sifter 130 is adapted to capture particles that are not captured by basket 120, and still allow for the free-flow of water. As discussed above, pre-filter skimmer 310 may be comprised of a fabric. Pre-filter skimmer 310 is not restricted to fabric, but may be made of any material that has orifices and is capable of capturing particles, such as plastic, metal, etc., and any combination thereof. By way of example, pre-filter skimmer 310 may be made of a fabric that can capture up to 80% of particles traveling through basket 120. In this regard, the orifices of pre-filter skimmer 310 are smaller than the orifices of skimming portion 235 of basket 120. The orifices of pre-filter skimmer 310 may be slightly smaller, substantially smaller, or anywhere in between, than the orifices of the skimming portion 235. As one example, pre-filter skimmer 310 may be configured to capture particles such as dirt, pollen and bacteria or perhaps broken down leaves that are too small to be captured by skimming portion 235.

The size of the orifices in pre-filter sifter 130 may dictate what types of particles are captured and what percentage of particles are captured. For example, larger or smaller orifices in pre-filter sifter 130 may cause more or less particles to pass through to the pool filter. The decision of the size of the orifices may depend on the requirements for the particular system being implemented. Various types, grades and sizes of pre-filter skimmer 310 are available as well. In this regard, pre-filter skimmer 310 may be removably attachable to pre-filter sifter 130, such as to second rim 320, via screws, bolts, male-female mating mechanisms, etc. Alternatively, there may be multiple types of pre-filter skimmer 310 that attach to pre-filter sifter 130. Pre-filter skimmer 310 may change based on the intended purpose, such as based on the size of debris or type of debris the user wants pre-filter sifter 130 to collect. As an example, different pre-filter skimmers 310 may include different sized orifices or different types of material used.

Thus, the combination of basket 120 and pre-filter sifter 130 may be considered a dual-skimming system configured to capture the maximum amount of particles and debris from the pool water. Such a dual-skimming system is advantageous because it allows for less particles and debris to travel to the pool filter via outlet 140. In turn, less strain is exerted on the pool filter and pump and, due to the reduction in strain, results in a longer life of the pool filter and allows for longer cycles between cleaning. Similarly, the dual-skimming system works when vacuuming the pool using vacuum plate 180, thereby minimizing the amount of debris entering the filter. As another example, pre-filter skimmer system 100 is not restricted to only two skimmers, but may contain any multiplicity of skimmers, such as three, four, etc. In this regard, the orifices of the skimming portion in each skimmer may implement different orifice sizes to capture different debris. The larger or smaller the orifices in each skimming portion may cause less or more debris to be captured, respectively. The decision of the size may be dictated by the requirements of the particular pre-filter skimming system.

As illustrated in FIG. 6, pre-filter skimmer 310 is designed to taper downward from an upper portion 640 to a lower portion 650. The distance between upper portion 640 to a side wall of chamber 105 is less than the distance between lower portion 650 to the side wall of chamber 105. By way of example only, this is depicted in FIG. 6 by brackets 670, 672, 674, and 676. Specifically, the distance between upper portion 640 and chamber 105 is approximately one (1) inch, and the distance between lower portion 650 and chamber 105 is approximately three (3) inches. Other variations of the distances are possible as well, such as two (2) inches on the upper portion and four (4) inches on the lower portion.

Pre-filter skimmer 310 is configured as such to allow for the free-flow of water even when the pre-filter sifter begins to fill with debris. For instance, if lower portion 650 maintained the same diameter as upper portion 640, then when the pre-filter sifter fills up with debris the pre-filter skimmer 310 may expand, causing pre-filter skimmer 310 to encounter the side wall of chamber 105. In this scenario, the pool water may have no avenue to enter outlet 140 because the area between pre-filter skimmer 310 and chamber 105 is blocked due to the expanded pre-filter skimmer of pre-filter sifter 130. However, by tapering off pre-filter skimmer 310 in a V-shaped or conical manner, the pool water has additional room to travel between pre-filter skimmer 310 and chamber 105 even when the pre-filter sifter begins to fill. It should be noted that the fabric of pre-filter skimmer 310 may be configured such that it cannot expand beyond a certain point, thus, prohibiting blockage from occurring.

In addition, a bottom portion 680 of pre-filter sifter 130 is also a certain distance from base 190 of chamber 105. The distance from bottom portion 680 to base 190 may be configured so that bottom portion 680 cannot block outlet 140 on base 190 while pre-filter sifter 130 is filling up with debris. Thus, by way of example only, the distance from bottom portion 680 to base 190 may be anywhere from 1-5 inches. As depicted in FIG. 6, a distance 678 from bottom portion 680 to base 190 is two (2) inches. The distance may also be dictated by the materials used to manufacture pre-filter skimmer 310. For instance, a tough material (e.g., metal) will result in less stretching of the material, thereby requiring less distance needed. Conversely, more elastic material (e.g., fabric) may result in greater stretching of the material, thereby requiring greater distance needed.

Other types of skimmer mechanisms for collecting particles and debris are also considered. For example, various collectors or capture mechanisms may be used to replace basket 120 or pre-filter sifter 130, such as strainers, screens, nets, bags, etc. The dual-skimming system may function by using two different skimming mechanisms (e.g., each skimming mechanism has different sized orifices) that are able to capture or collect debris, particles, etc. that would enter pre-filter skimmer system 100. In a further embodiment, a plurality of collector mechanisms may be implemented in addition to and in conjunction with basket 120 and pre-filter sifter 130.

The dual-skimming system described above is advantageous because it allows for more debris to be captured by the skimmers, thus lengthening the life of the pump and main filter or the amount of time between cleaning the pool filter. The dual-skimming system operates not only when water enters the inlet of pre-filter skimming system 100, but also when vacuuming the pool using vacuum plate 180.

Pre-filter sifter 130 has been configured to capture particles that were not initially captured by basket 120, and can indeed capture a much greater percentage of particles that would otherwise enter the pump and main filter. In addition, the size and shape of pre-filter sifter 130 is configured to stay within a certain distance from the inner wall of chamber 105, thereby preventing any possibility of a blockage while pre-filter sifter 130 is filling up with debris. Furthermore, as described above a multiplicity of skimmers may be implemented, each skimmer containing different sized orifices to capture different types of particles.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:
1. A pre-filter skimmer system (100), comprising:
   a chamber (105) being defined by a housing having a sidewall, an opening on top of the sidewall and a single outlet (140) at the bottom (190) of the sidewall, with no other openings therebetween, said sidewall having a top end surface and arranged such that water enters the chamber (105) only via the top opening and exits the chamber (105) only via the single outlet (140);
   a first collector (120) made of plastic or metal capable of withstanding water pressure and positioned within the chamber (105) and configured to capture particles of a first size carried with the water;

a second collector (130) made of fabric, plastic or metal and capable of withstanding flow of water and positioned within the chamber (105) downstream of the first collector (120), wherein the second collector (130) is configured to capture particles of a second size smaller than the first size that passed through the first collector (120), the first collector (120) extending down into the second collector (130), the first and second collectors (120, 130) having orifices, the orifices in the second collector (130) being smaller than orifices in the first collector (120), the first and second collectors (120, 130) arranged with respect to one another such that water completely flows through both said first and second collectors (120, 130) and at least partially flows laterally outwardly from the first collector (120) through the second collector (130), and particles of both first and second sizes are simultaneously captured by said first and second collectors (120, 130), and the second collector (130) having a bottom (680) spaced above and away from the bottom (190) of the chamber (105).

2. The pre-filter skimmer system of claim 1, wherein the first collector has orifices that are between ⅛ to ⅜ inches wide.

3. The pre-filter skimmer system of claim 1, wherein the second collector is configured to hold particles including pollen, bacteria, and dirt.

4. The pre-filter skimmer system of claim 1, wherein both the first and second collectors are each conical in shape having an upper portion and a lower portion, wherein the upper portion is a first diameter that is greater than a second diameter of the lower portion.

5. The pre-filter skimmer system of claim 1, further comprising a first rim attached to the first collector and a second rim attached to the second collector, wherein the first rim rests directly on top of the second rim.

6. The pre-filter skimmer system of claim 1, further comprising:
a first rim attached to the first collector, the first rim including a first mating mechanism; and
a second rim attached to the second collector, the second rim including a second mating mechanism,
wherein the first mating mechanism is configured to mate with and on top of the second mating mechanism.

7. The pre-filter skimmer system of claim 6, wherein the first mating mechanism is a downwardly-extending tab and the second mating mechanism is an upwardly-facing notch, and a shape and size of the tab substantially corresponds to a shape and size of the notch.

8. The pre-filter skimmer system of claim 1, wherein a space is defined between an inner wall of the chamber and an outer wall of the second collector, and configured to direct flow of water outwardly through both said first and second collectors and the space and through the outlet.

9. The pre-filter skimmer system of claim 8, wherein the second collector has an expanded state and is configured such that when in the expanded state the outer wall of the second collector is distanced from the inner wall of the chamber.

10. The pre-filter skimmer system of claim 4, wherein the first collector tapers inwardly away from the inner surface of the second collector in the downward direction.

11. The pre-filter skimmer system of claim 1, wherein the second collector tapers from a top portion to a bottom portion thereof, thereby at least partially forming a conical shape.

12. The pre-filter skimmer system (100) of claim 1, configured to direct uninterrupted flow of water from said second collector (130) to said outlet (140) without any other components therebetween.

13. The pre-filter skimmer system (100) of claim 1, additionally comprising a vacuum plate (180) configured to fit over both said first and second collectors (120, 130) and attachable to a vacuum hose.

14. The pre-filter skimmer system (100) of claim 1, wherein the second collector (130) is made of plastic or metal and capable of withstanding the flow of water.

15. A pre-filter skimmer system (100), comprising:
a chamber (105) being defined by a housing having a sidewall, an opening on top of the sidewall and a single outlet (140) at the bottom (190) of the sidewall, with no other openings therebetween, said sidewall having a top end surface and arranged such that water enters the chamber (105) only via the top opening and exits the chamber (105) only via the single outlet (140);
a first collector (120) made of plastic or metal and capable of withstanding water pressure and positioned within the chamber (105) and configured to capture particles of a first size carried with the water;
a second collector (130) made of fabric, plastic or metal and capable of withstanding flow of water and positioned within the chamber (105) downstream of the first collector (120), wherein the second collector (130) is configured to capture particles of a second size smaller than the first size that passed through the first collector (120),
the first collector (120) extending down into the second collector (130),
the first and second collectors (120, 130) having orifices, the orifices in the second collector (130) being smaller than orifices in the first collector (120),
the first and second collectors (120, 130) arranged with respect to one another such that water completely flows through both said first and second collectors (120, 130) and at least partially flows laterally outwardly from the first collector (120) through the second collector (130), and particles of both first and second sizes are simultaneously captured by said first and second collectors (120, 130), and
the second collector (130) having a bottom (680) spaced above and away from the bottom (190) of the chamber (105), wherein
the first and second collectors (120, 130) are each conical in shape having an upper portion and a lower portion, wherein the upper portion is a first diameter greater than a second diameter of the lower portion,
the first collector (120) tapers inwardly away from an inner surface of the second collector (130) in a downward direction and is spaced away from the inner surface of the second collector (130),
the second collector (130) is spaced away from an inner wall of the chamber (105) which is substantially cylindrical in shape, to direct the flow of water laterally outwardly from the first collector (120) through the second collector (130), and
the orifices of both said first and second collectors (120, 130) extend entirely around the circumferences and bottoms thereof.

16. The pre-filter skimmer system (100) of claim 15, wherein the second collector (130) is made of plastic or metal and capable of withstanding the flow of water.

\* \* \* \* \*